United States Patent [19]

Chennakeshu et al.

[11] Patent Number: 5,406,593
[45] Date of Patent: Apr. 11, 1995

[54] ADAPTIVE PHASE-LOCKED LOOP EMPLOYING CHANNEL STATE INFORMATION ESTIMATION FROM RECEIVED SIGNAL PHASE ANGLES

[75] Inventors: Sandeep Chennakeshu, Schenectady; Ravinder D. Koilpillai; Raymond L. Toy, both of Lathan, all of N.Y.

[73] Assignee: General Electric Company, Schenectady, N.Y.

[21] Appl. No.: 109,554

[22] Filed: Aug. 20, 1993

[51] Int. Cl.[6] .................................. H03D 3/24
[52] U.S. Cl. ........................ 375/120; 375/81; 375/104; 331/1 R
[58] Field of Search ............ 375/80, 81, 82, 94, 375/97, 99, 104, 111, 118, 120; 331/1 R, 25, 1 A, 34

[56] References Cited

U.S. PATENT DOCUMENTS

| | | | |
|---|---|---|---|
| 4,856,028 | 8/1989 | Scales | 375/97 |
| 4,953,185 | 8/1990 | Goode | 375/120 |
| 5,107,522 | 4/1992 | Kitayama et al. | 375/97 |

Primary Examiner—Stephen Chin
Assistant Examiner—Don N. Vo
Attorney, Agent, or Firm—Lawrence P. Zale; Marvin Snyder

[57] ABSTRACT

A method of estimating the quality of a communication channel from a differential phase angle between a received signal and the corresponding transmitted phase angle employs determining a signal to impairment ratio (SIR) as an indicator of channel state information (CSI). A maximum likelihood estimation procedure is employed to calculate this CSI metric as a function of the differential phase angle between the received signal and transmitted signal. An alternate embodiment employs a estimation that incorporates average SIR information for a Rayleigh fading channel. Since CSI is derived from the phase angle of the received signal, and does not require signal amplitude information, it is attractive for use with differential detectors, phase-locked loops (PLLs) and hard-limited signals. The CSI provided can be used for implementing post detection selection diversity, by selecting the signal from a plurality of antennae which has the best SIR.

13 Claims, 4 Drawing Sheets

ADAPTIVE PHASE-LOCKED LOOP EMPLOYING CHANNEL STATE INFORMATION ESTIMATION FROM RECEIVED SIGNAL PHASE ANGLES

CROSS REFERENCES TO RELATED APPLICATIONS

This application is related to U.S. Patent applications "Post Detection Selection Combining Diversity Receivers for Mobile and Indoor Radio Channels" by S. Chennakeshu, S. M. Hladik, G. Saulnier, R. Koilpillai and R. Toy Ser. No. 08/109,556, filed Aug. 20, 1993 and "Post Detection Weighted Vector Combining Diversity Receivers Using Phase Metrics for Mobile and Indoor Radio Channels" by S. M. Hladik, S. Chennakeshu Ser. No. 08/109,553, filed Aug. 20, 1993, all assigned to the present assignee and hereby incorporated by reference.

BACKGROUND OF THE INVENTION

1. Field of the Invention

The present invention related generally to communication of digital information and more specifically to channel state information estimation employed in decoding transmitted digital information.

2. Description of Related Art

Digital information is transmitted from one place to another through a channel. A channel is a general term referring to the medium through which a signal is transmitted. The channel may be a radio transmission, local area network transmission, telephone transmission, etc. In each case, the received signal differs from the transmitted signal due to the effects of the transmission through the channel. In most digital communication systems it is desirable to have knowledge of this channel information, known as channel state information (CSI) at any instant of time in order to properly decode the transmitted information.

Typically, CSI is derived using synchronization ("sync") signals, which may be sounding signals or a set of pilot symbols sent by the transmitter. The sync signals are predetermined and stored in the receiver. During transmission, the receiver compares the stored sync signals with the received signals and estimates the channel impulse response (CIR). This may be performed by a mean squared error or a least squares error formulation.

The received signal may be viewed as a vector comprising an amplitude component and a phase angle. In many applications only the phase angle of the received signal is retained for decoding the signal, as in the case of differential detection. The motivation for retaining only the phase angles is that the receiver may be is simplified. Also, with differential encoding and detection, the transmission is more resistant to fading and Doppler frequency shifts. In other situations the received signal may be hard-limited, where the amplitude is limited to a maximum amplitude value, and hence only the phase angles of the received signal are available for decoding. The transmitted signals is sent with message data interleaved in periods between the sync signals. Therefore, in the absence of known sync signals (pilot or sounding), the CSI must be estimated from previous CSI or determined from the received signal directly.

CSI may be used in a number of ways to enhance detection of the transmitted signal. Some examples are:

Post-Detection Selection Diversity for Radio Transmission

A typical implementation of post-detection selection diversity will employ several antennae each attached to a separate receiver branch. The data is demodulated independently for each receiver branch to produce an output signal. The CSI of each output signal is determined and the output signal having the best CSI is chosen for symbol decoding. The decision for choosing which one of the receivers output signals to decode may be performed on a symbol- by-symbol basis.

PLL Adaptation

In a coherent communication system it is customary to use a circuit which tracks and adjusts to carrier frequency changes, commonly known as phase-locked loops (PLLs). The PLL makes adjustments based upon perceived error. If the channel quality is poor, incorrect updates are fed to the PLL and it can become unstable. This can be prevented by using CSI information to adjust the PLL adaptation according to channel conditions. A similar argument holds for phase adjustment loops (PALs) employed in maximum likelihood sequence estimation (MLSE) decoders which track the carrier phase.

Errors and Erasure Decoding

Errors and Erasure decoding is typically employed with forward error correction schemes. Each decoded bit or symbol is identified as good or corrupted. The corrupted bit/symbols are marked as such. A good bit/symbol is detected as is, but an corrupted bit/symbol is ignored. The redundant error correction scheme at a receiver derives a replacement bit/symbol for each corrupted bit/symbol from the remaining bits/symbols. If the corrupted bit/symbol was employed in decoding, then a mistake could have been made which in turn would cause further errors. Hence, erasure decoding enhances bit error rate (BER) performance considerably. To effect such erasure decoding a symbol by symbol estimate of CSI is required.

Currently there is a need for a suitable measure of channel quality (CSI) from the phase angle of the received signal.

SUMMARY OF INVENTION

Signals transmitted through a channel are received, and the channel quality, referred to as a signal-to-impairment ratio (SIR) is determined for the channel. This SIR takes into account not only added white Gaussian noise, but data noise introduced by intersymbol interference, adjacent channel interference, and co-channel interference. An instantaneous and averaged SIR is determined from received signal phase angles, using the principles of ML (maximum likelihood) and MAP (maximum a posteriori) estimation. The SIR values are used in a number of applications. Specifically, they are useful in errors and erasure decoding, post-detection antenna diversity, and coherent detection, employing phase-locked loops.

OBJECTS OF THE INVENTION

It is an object of the present invention to provide a metric for estimating channel state information (CSI) that can be derived from received signal phase angles.

Another object of the present invention is to provide a method of determining CSI that does not require sounding or pilot signals.

Another object of the present invention is to provide a method of determining CSI in systems where only symbol phase angles are available such as systems employing hard-limited signals or systems employing phase detectors.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

CSI Metric Derivation

Figure 1:
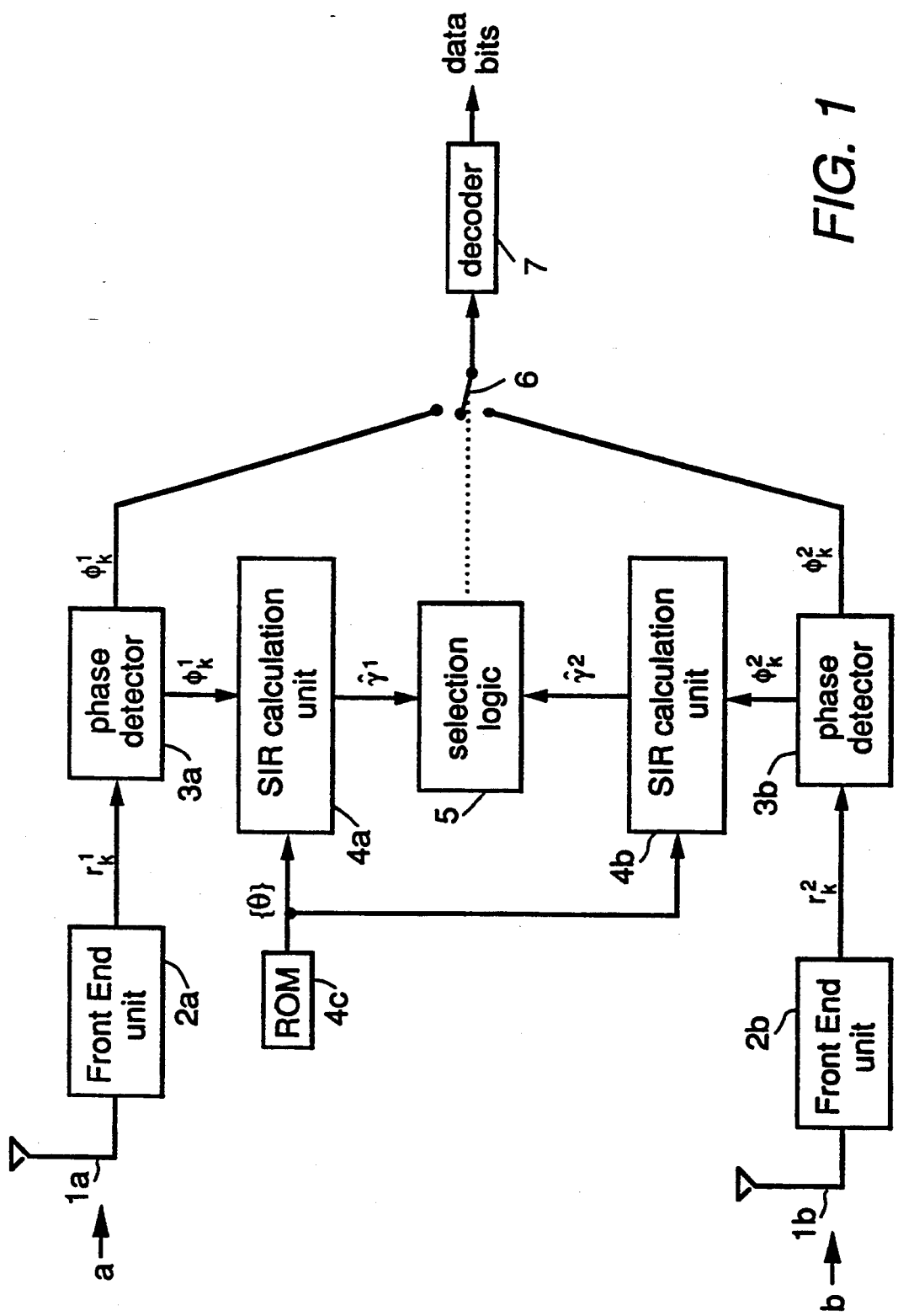
FIG. 1 is a simplified block diagram of a Post Detection Selection Diversity demodulator having two demodulation branches employing signal-to-impairment ratio estimation according to the present invention.

Digital information desired to be transmitted, message data, is encoded and transmitted through a channel to a receiver and heterodyned to a baseband signal. The received baseband signal is sampled into a stream of received samples $r_k$, which can be represented as:

$$r_k = g_k e^{j\theta_k} + I_k e^{j\Psi_k} + \eta_k \quad (1)$$

corresponding to the $k^{th}$ sampling instant, where $g_k$ is the amplitude of the desired signal, and $\theta_k$ is the corresponding phase angle, $I_k$ is the composite amplitude of the interfering signals, $\Psi_k$ the corresponding phase angle of the interfering signal, and $\eta_k$ is the additive white Gaussian noise (AWGN) component. It is assumed that one sample per symbol interval is sufficient for estimating the CSI.

From Equation (1) it is observed that the received signal comprises the desired signal and two sources of interference, namely, data noise from interfering signals and AWGN. The data noise may arise when a previously transmitted symbol interferes with a presently transmitted symbol, known as intersymbol interference (ISI). Signals from transmitters geographically adjacent to the receiver, and transmitted on frequencies spectrally adjacent those received by the receiver may be a second source of data noise known as adjacent channel interference (ACI). A third source of data noise is from a transmitter transmitting on the same frequency, but from a communicating cell which is not adjacent to the present cell. This is known as co-channel interference (CCI).

Data noise can be assumed to be a zero mean complex Gaussian random variable similar to the AWGN. This is a practical approximation which simplifies the derivation of the CSI estimate from the received phase angle.

Let the variance of the data noise and AWGN be denoted as $2\sigma_D^2$ and $2\sigma_N^2$ respectively.

The measure of CSI is defined to be the ratio of the instantaneous signal power $g_k^2$, to the variance of the data noise plus the variance of the AWGN component as follows:

$$CSI = \gamma_k = \frac{g_k^2}{2(\sigma_D^2 + \sigma_N^2)} \quad (2)$$

where $\gamma_k$ is the instantaneous signal-to-impairment ratio (SIR). SIR is a better indicator of channel quality than signal-to-noise ratio since it also takes into account the influence of data noise which is a function of the channel. If there is no data noise (no ISI, ACI or CCI), then Equation (2) reduces to an instantaneous signal-to-noise ratio.

The problem that remains is to determine $\gamma_k$ which will be used as an estimate of CSI. From Equation (1), the received signal phase angle is:

$$\phi_k = \text{Tan}^{-1} \frac{g_k \sin \theta_k + I_k \sin \psi_k + \eta_{qk}}{g_k \cos \theta_k + I_k \sin \psi_k + \eta_{ik}} \quad (3)$$

where $\eta_{ik}$ and $\eta_{qk}$ are the in-phase and quadrature components of the AWGN, namely, $\eta_k = \eta_{ik} + j\eta_{qk}$.

If the data noise and AWGN are grouped together as a composite complex Gaussian noise component ($\xi_{qk}$, $\xi_{ik}$) with zero mean and a variance of $2(\sigma_D^2 + \sigma_N^2)$ it may be expressed as:

$$\phi_k = \text{Tan}^{-1} \frac{g_k \sin \theta_k + \xi_{qk}}{g_k \cos \theta_k + \xi_{ik}} \quad (4)$$

where $\xi_{qk} = I_k \sin \Psi_k + \eta_{qk}$ and $\xi_{ik} = I_k \cos \Psi_k + \eta_{ik}$, are zero mean Gaussian random variables with variance $\sigma_D^2 + \sigma_N^2$. A conditional probability density function being the probability of receiving a phase angle $\phi_k$ given $\theta_k$ and $\gamma_k$ is described by:

$$P(\phi_k | \theta_k, \gamma_k) = \frac{1}{2\pi} e^{-\gamma_k} \Bigg( 1 + \sqrt{4\pi\gamma_k} \cos(\theta_k - \phi_k) e^{\gamma_k \cos^2(\theta_k - \phi_k)} \bigg\{ 1 - \frac{1}{2} \text{erfc}(\sqrt{\gamma_k} \cos(\theta_k - \phi_k)) \bigg\} \Bigg) \quad (5a)$$

where erfc is a complementary error function defined by:

$$\text{erfc}(x) = \frac{2}{\sqrt{\pi}} \int_x^\infty e^{-t^2} dt. \quad (5b)$$

For $\gamma_k >> 1$ and $$|\theta_k - \phi_k| < \frac{\pi}{2}$$

Eqs. (5a) and (5b) may be approximated as:

$$P(\phi_k|\theta_k,\gamma_k) = \sqrt{\frac{\gamma_k}{\pi}} \cos(\theta_k - \phi_k) e^{-\gamma_k \sin^2(\theta_k - \phi_k)} \quad (6)$$

The above approximation is valid for reasonable SIRs (>3 dB)

and for $|\theta_k - \phi_k| < \frac{\pi}{2}$.

An estimate of $\gamma_k$ or CSI may now be obtained employing the maximum likelihood (ML) estimation rule which is expressed as a solution to the equation:

$$\frac{\partial}{\partial \gamma_k} \ln P(\phi_k|\theta_k,\gamma_k) = 0 \quad (7)$$

ln denotes the natural logarithm. Substituting Eq. (6) in Eq. (7) and solving yields:

$$\hat{\gamma}_k^{ML} = \frac{1}{2\sin^2(\theta_k - \phi_k)} \quad (8)$$

where $\hat{\gamma}_k^{ML}$ is an ML estimate of the SIR, $\gamma_k$.

In many instances the estimate provided for by Eq. (8) will be noisy and may be improved upon by averaging over a number of instantaneous estimates. This modification is useful only if the data samples are independent. Assuming the noise samples are independent from sample to sample and that the channel is quasistationary, then N samples may be used to obtain a better ML estimate as a solution to:

$$\frac{\partial}{\partial \gamma_k} \ln \prod_{k=1}^{N} P(\phi_k|\phi_k,\gamma_k) = 0 \quad (9)$$

In Eq. (9) it was assumed that samples are required at the same point in each symbol interval and that the channel is stationary therefore $\gamma_k$ is independent of the index k and $\gamma_k = \gamma$. Now, solving Eq. (9) using Eq. (6):

$$\hat{\gamma}^{ML} = \frac{1}{\frac{1}{N}\sum_{k=1}^{N} 2\sin^2(\theta_k - \phi_k)} \quad (10)$$

The estimate given by Eq. (10) holds only if the channel is quasi-stationary and if there is independence of samples. This is typically true for an indoor portable radio channel.

For a Rayleigh fading channel, an a posteriori estimate may be made for the probability density function for $\gamma_k$. An alternate estimate, being a "maximum a priori" (MAP) estimate may be used to replace the ML estimate, but only for Rayleigh fading channels. The MAP estimate $\hat{\gamma}^{MAP}$ is given by a solution to:

$$\frac{\partial}{\partial \gamma_k} \ln P(\phi_k|\theta_k,\gamma_k) + \frac{\partial}{\partial \gamma_k} \ln P(\gamma_k) = 0 \quad (11)$$

with the probability density function $P(\gamma_k)$ given by:

$$P(\gamma_k) = \frac{1}{\overline{\gamma}} e^{-\gamma_k/\overline{\gamma}} \quad (12)$$

where $\overline{\gamma}$ is the average signal-to-noise ratio (SNR) which may be calculated by conventional methods. Now, solving Eq. (11) employing Eqs. (6) and (12) results in:

$$\hat{\gamma}_k^{MAP} = \frac{1}{2\left(\sin^2(\theta_k - \phi_k) + \frac{1}{\overline{\gamma}}\right)} \quad (13)$$

at the kth sampling point.

Once again, for the quasi-static channel with independent samples, a time averaged estimate may be obtained as a solution to:

$$\frac{\partial}{\partial \gamma_k} \ln \prod_{k=1}^{N} P(\phi_k|\theta_k,\gamma) + N\frac{\partial}{\partial \overline{\gamma}} \ln P(\gamma) = 0 \quad (14)$$

Solving Eq. (14) with Eqs. (6) and (12):

$$\hat{\gamma}^{MAP} = \frac{1}{2\left(\frac{1}{N}\sum_{k=1}^{N}\sin^2(\theta_k - \phi_k) + \frac{1}{\overline{\gamma}}\right)} \quad (15)$$

Equations (8), (10), (13) and (15) provide 4 metrics which may be used to estimate the SIR which can be used as an indicator of channel quality. These may be compared to a minimum threshold value or the inverse of the SIR values may be compared to a maximum value to test for signal quality. The latter comparison does not require a division which the former would, resulting in fewer calculations.

A smoothed metric may be defined as follows:

$$\hat{\gamma}_k^{(s)} = \frac{\sum_{m=1}^{k} \lambda^{k-m} \hat{\gamma}_m}{\sum_{m=0}^{k-1} \lambda^m} \quad (16)$$

where $\lambda$ is a value between 0 and 1 and is typically chosen as a compromise between smoothing the noisy estimate and tracking fast variations of channel quality or SIR. This may be computed recursively as follows:

$$\hat{\gamma}_k^{(s)} = \hat{\gamma}_{k-1}^{(s)} + \frac{1}{\rho_k}(\hat{\gamma}_k - \hat{\gamma}_{k-1}^{(s)}) \quad (17)$$

and
and $\rho_k$ is given by:

$$\rho_k = \lambda \rho_{k-1} = 1 \quad (18)$$

and $\rho_0 = 0$.

Another, useful metric is to chose T as the median value of a set of estimates given by:

$$\hat{\gamma}^{med} = \text{median}\{\hat{\gamma}_1, \hat{\gamma}_2, \ldots, \hat{\gamma}_N\} \quad (19)$$

where $\hat{\gamma}_k$, k = 1, 2, ..., N may be computed from Eqs. (8) or (13).

While the use of $\hat{\gamma}_k$ (the instantaneous SIR) for post detection diversity combining yields improvement in a fading channel compared to differential detection alone, the estimate of instantaneous SIR will be noisy. The performance of post detection selection diversity can be improved by filtering the selection metric with metric filters, if the noisy symbols are independent from symbol to symbol and the channel is quasi-stationary over a duration of a metric filter impulse response. Let $\hat{\gamma}_k$ be the instantaneous SIR metric at time $kT$, where $T$ is the symbol interval and $k$ is an integer. Then, a simple filtered selection metric can be written as:

$$\hat{\gamma}_k^{ave} = \sum_{i=k-L+1}^{k} h(i - k + L - 1)\hat{\gamma}_i \qquad (20)$$

where $h(.)$ are coefficients of the impulse response of a metric filter and $L$ is the length of the impulse response in symbol intervals, chosen to be the average fade duration of the channel.

Eq. (20) represents causal filtering of selection metric $\gamma_k$. If signal samples and instantaneous SIR estimates are stored in memory, the selection metrics can be smoothed by non-causal filtering. This non-causally filtered metric can be expressed as:

$$\hat{\gamma}_k^{ave(nc)} = \sum_{i=k-M}^{k+N} h(i - k + M)\hat{\gamma}_i \qquad (21)$$

where $$M = f\left(\frac{L}{2}\right), N = g\left(\frac{L-2}{2}\right) \text{ and } f\left(\frac{L}{2}\right)$$

is a floor function representing the largest integer less than $L/2$, and $$g\left(\frac{L-2}{2}\right)$$

represents a ceiling function being the smallest integer greater than $$\frac{L-2}{2}$$

Summary of CSI Metrics

Eight metrics have been derived for CSI based on a differential phase between the received signal phase $\phi_k$ and the transmitted phase angle $\theta_k$. These metrics are as follows:

Metric 1: Instantaneous ML Estimate $$\hat{\gamma}_k^{ML} = \frac{1}{2\sin^2(\theta_k - \phi_k)} \qquad (22)$$

Metric 2: Averaged ML Estimate $$\hat{\gamma}^{ML} = \frac{1}{\frac{1}{N}\sum_{k=1}^{N} 2\sin^2(\theta_k - \phi_k)} \qquad (23)$$

Metric 3: Instantaneous MAP Estimate $$\hat{\gamma}_k^{MAP} = \frac{1}{2\left\{\sin^2(\theta_k - \phi_k) + \frac{1}{\bar{\gamma}}\right\}} \qquad (24)$$

Metric 4: Averaged MAP Estimate $$\hat{\gamma}^{MAP} = \frac{1}{2\left\{\frac{1}{N}\sum_{k=1}^{N}\sin^2(\theta_k - \phi_k) + \frac{1}{\bar{\gamma}}\right\}} \qquad (25)$$

Metric 5: Exponentially Smoothed Estimate $$\hat{\gamma}_k^{(s)} = \frac{\sum_{m=1}^{k} \lambda^{k-m}\hat{\gamma}_m}{\sum_{m=0}^{k-1} \lambda^m} \qquad (26)$$

where $\hat{\gamma}_k$ may be computed from Eqs. (8) or (13). The metric described by Eq. (26) can be computed recursively for a desired number of repetitions to result in a smoothed SIR estimation according to:

$$\hat{\gamma}_k^{(s)} = \hat{\gamma}_{k-1}^{(s)} + \frac{1}{\rho_k}(\hat{\gamma}_k - \hat{\gamma}_{k-1}^{(s)}) \qquad (27a)$$

and $\rho_k$ is given by:

$$\rho_k = \lambda\rho_{k-1} + 1 \qquad (27b)$$

and $\rho_0 = 0$, and $\lambda$ is a value between 0 and 1.

Metric 6: Median Estimate $$\hat{\gamma}^{med} = \text{median } \{\hat{\gamma}_1, \hat{\gamma}_2, \ldots, \hat{\gamma}_N\} \qquad (28)$$

where $\hat{\gamma}_k$, $k=1,2,\ldots,N$ may be computed from Eqs. (8) or (13).

Metric 7: Causal Filtering Estimate $$\hat{\gamma}_k^{ave} = \sum_{i=k-L+1}^{k} h(i - k + L - 1)\hat{\gamma}_i \qquad (29)$$

where $h(i)$ are coefficients of the impulse response of a metric filter and $L$ is the length of the impulse response in symbol intervals, chosen to be the average fade duration of the channel.

Metric 8: Non-Causal Filtering Estimate $$\gamma_k^{ave(nc)}(k) = \sum_{i=k-M}^{k+N} h(i - k + M)\gamma_i \qquad (30)$$

where $$M = f\left(\frac{L}{2}\right), N = g\left(\frac{L-2}{2}\right) \text{ and } f\left(\frac{L}{2}\right)$$

is a floor function representing the largest integer less than $L/2$, and $$g\left(\frac{L-2}{2}\right)$$

represents a ceiling function being the smallest integer greater than $$\frac{L-2}{2}$$

Application of CSI Metrics

The CSI metrics described in Eqs. (22)–(30) may be employed to enhance the performance of a digital radio receiver in many applications such as the following.

a. Post-Detection Selection Diversity

FIG. 1 illustrates a schematic of a digital receiver having 2 branches, "a" and "b", employing post detection selection diversity. Antennae 1a and 1b sense a radio signal which has digital information encoded in it. Front end units 2a, 2b convert the signal sensed by antennae 1a, 1b, respectively, to an intermediate frequency signal and then to a baseband signal which is sampled to produce the stream of samples $r_k^1$, $r_k^2$. Phase detectors 3a, 3b detect a plurality of phase angles $\phi_k^1$, $\phi_k^2$ from the samples of front end units 2a, 2b, respectively.

SIR calculation units 4a, 4b determine SIRs $\gamma^1$, $\gamma^2$ using phase angles $\phi_k^1$, $\phi_k^2$ and the symbol constellation phase points $\{\theta\}$ stored in a suitable storage means, such as in a read-only memory (ROM) 4c of FIG. 1, according to Eqs. (22)–(30).

A selection logic circuit 5 compares the SIR metrics $\hat{\gamma}^1$, $\hat{\gamma}^2$, provided by SIR calculation units 4a, 4b, and causes a branch selection device 6 to connect the receiver branch corresponding to the SIR value indicating greater channel quality to a decoder 7. Decoder 7 then decodes the phase angle $\phi_k^j$ into decoded message bits. This selection is done on a symbol-by-symbol basis. Instead of using a maximum value of $\hat{\gamma}^j$ decision rule, selection logic unit 5 may employ a minimum value of $$\frac{1}{\hat{\gamma}^j}$$

for receive branch selection decisions. The latter rule avoids a division operation, as indicated by Eqs. (22)–(30).

SIR calculation units 4a, 4b may also employ metric filter units which filter the SIR metrics according to equations (29) and (30). Eqs. (22), (24), (26), (29) and (30) describe metrics best suited for a mobile radio channel, while Eqs. (23), (25), (26) and (28) describe metrics best suited for indoor portable radio channels.

If Eqs. (22) or (24) are used as the metric of channel quality, the metric calculation may be simplified as follows. Let $\hat{\gamma}^1$, $\hat{\gamma}^2$ represent the SIRs estimated for the output signals from phase detectors 3a, 3b, respectively.

The comparison of $\hat{\gamma}_k^1$ to $\hat{\gamma}_y^2$ is equivalent to the comparison of $|\theta_k^1 - \phi_k^1|$ to $|\theta_k^2 - \phi_k^2|$ where $\theta_k^1$, $\phi_k^1$ refer to a transmitted symbol phase, and a received symbol phase, respectively, from phase detector 3a; and $\theta_k^2$, $\phi_k^2$ refer to a transmitted symbol phase, and a received symbol phase, respectively, from phase detector 3b.

b. PLL Adaptation

Figure 2:
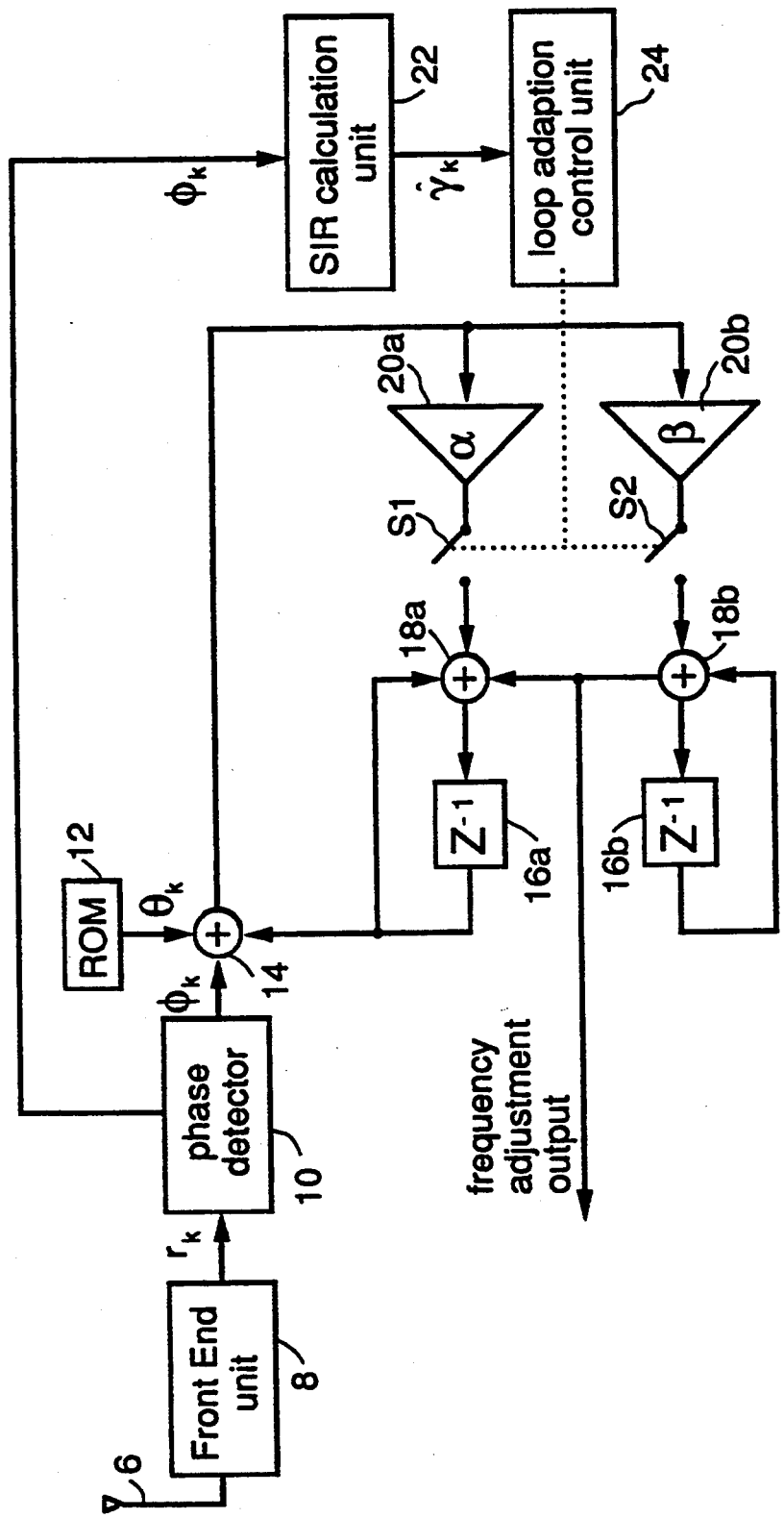
FIG. 2 is a simplified block diagram of a second order phase-locked loop with adaption control employed in a demodulator employing signal-to-impairment ratio estimation according to the present invention.

Conventional communication systems typically employ PLLs as shown in FIG. 2 for automatic frequency control (AFC) and for a coherent demodulation. A PLL is an estimator of received phase or frequency and employs a closed loop adaptation procedure to track the signal phase or frequency. An antenna 6 receives a radio signal having digital information encoded in it. A front end 8 heterodynes the received carrier signal to a baseband signal which is then sampled. A phase detector 10 extracts phase angles $\phi_k$ from the baseband signal samples. A set of predetermined phase angles $\theta$ is stored in a storage device such as read only memory (ROM) 12. A summer 14 combines received signal phase angles $\phi_k$ with a corresponding predetermined phase angles $\theta_k$ and a feedback signal to produce sent to gain units 20a, 20b. Summers 18a, 18b and delay units 16a, 16b are connected as shown in FIG. 2 to utilize the outputs of gain units 20a, 20b to create the feedback signal and comprise a PLL. The PLL produces a frequency (phase) adjustment $\Delta\Phi$ which is used to adjust the is frequency being received by a receiver closer to the transmitter frequency. An SIR calculation unit 22 estimates SIR values $\hat{\gamma}_k$ according to Eqs. (22)–(30). For this application, instantaneous estimates of SIR are too noisy to be reliable and hence the metrics given by Eqs. (23), (25), (26) and (28) are recommended. Under poor channel conditions, the PLL becomes unstable, resulting in what is termed loop "hang-up". This can be mitigated by not allowing the PLL to adapt during poor channel conditions, determined by CIR estimates of Eqs. (22)–(30). During the poor channel condition periods, the PLL does not adjust its current carrier frequency estimation and "coasts". A loop adaption control unit 24 monitors the SIR $\hat{\gamma}_k$. If the value of $\hat{\gamma}_k$ falls below a predetermined threshold level, the loop switches S1 and S2 are opened and the loop will coast providing a frequency correction corresponding to the frequency estimate obtained prior to the opening of the switches S1 and S2. When the SIR $\hat{\gamma}_k$ rises above the predetermined threshold value, S1 and S2 are closed allowing for the PLL to function normally.

c. MLSE Phase Decoder

Since initially known sync signals were transmitted as phase angles, they may be compared with corresponding received symbols during their transmission and the metrics Eqs. (22)–(30) can be used as described previously. In the absence of such explicit knowledge of the transmitted phase angles $\theta_k$, from a set of symbol constellation phase points $\{\theta\}$, decision directed estimation will have to be used. That is, a tentative decision on $\theta_k$ is used to estimate the SIR $\hat{\gamma}_k$. The tentative decision on $\theta_k$ is provided using a "maximum likelihood" criterion, based on $|\theta_k - \phi_k|$. In the case of a maxim-m likelihood sequence estimator (MLSE) type decoder, this estimation is performed by estimating the maximum likelihood path of a trellis, along which the value of $\theta_k$ is most reliable. For a symbol by symbol detector, this estimation corresponds to using the value of $|\theta_k - \phi_k|$ that is the smallest for all possible transmitted set of symbol constellation phase points $\{\theta\}$.

A MLSE phase decoder for QPSK signals may be implemented using a 4 state Viterbi algorithm using Eq. (5) as the branch metric. From Eq. (5) it is observed that the SIR, $\hat{\gamma}_k$, is required to be known to compute the branch metric. If a fixed value of $\hat{\gamma}_k$ is employed, the implementation would be sub-optimal, and this realization results in poor BER. Hence, it is important to use an estimate Of $\hat{\gamma}_k$ in the branch metric calculation. This is equivalent to having an adaptable branch metric that varies with the channel quality.

The MLSE phase decoder is a coherent decoder and requires tracking of the signal phase. This is done through a PLL. Hence, as mentioned above, the PLL adaptation will also be controlled through the estimate of $\hat{\gamma}_k$.

The estimates provided by Eqs. (22), (26), (29) and (30) are recommended for use with the MLSE phase decoder for branch metric calculation and PLL adaptation in a mobile or indoor portable radio channel.

d. Errors and Erasure Decoding

Figure 3:
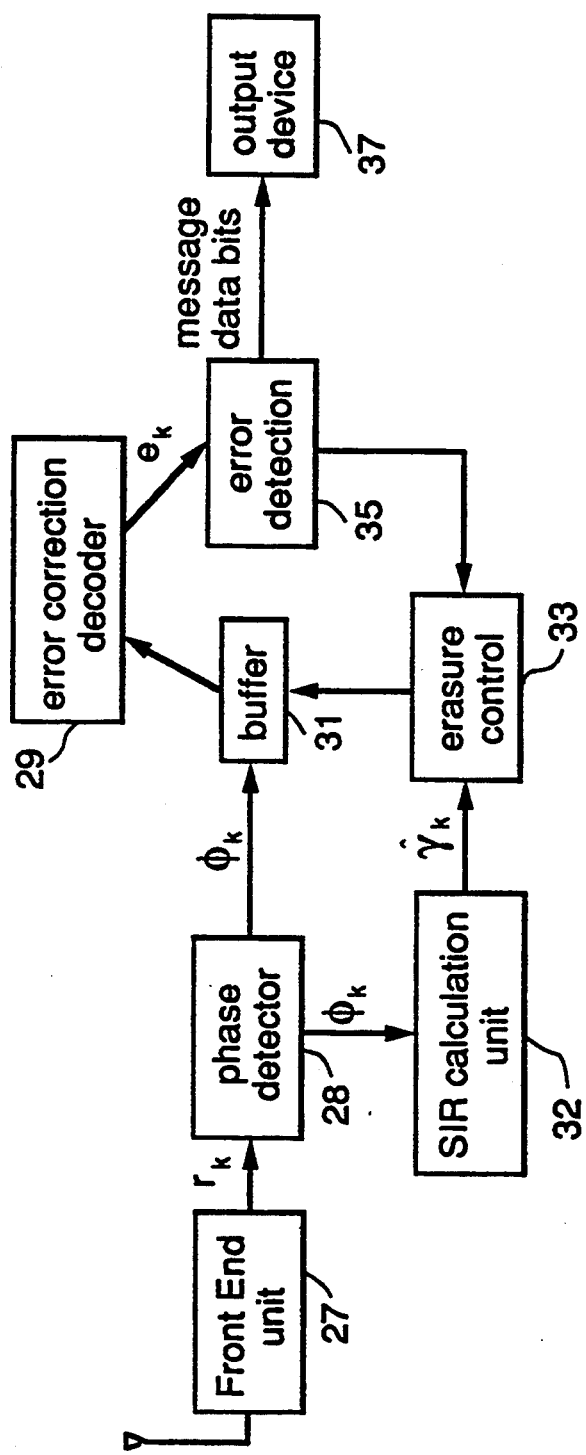
FIG. 3 is a simplified block diagram of a first embodiment of a demodulator employing signal-to-impairment ratio estimation for errors and erasures decoding, according to the present invention.

FIG. 3 illustrates a simplified block diagram of a system employing errors and erasure decoding. In this system, data desired to be transmitted, message data, is encoded with error correction code to add redundancy. The encoded data is mapped to a series of symbols, $\theta_k$, each chosen from a set of signal constellation points $\{\theta\}$. These symbols, $\theta_k$, are transmitted through the channel. The received signal is processed by a front end unit 27 which heterodynes and samples the received signal into a stream of samples, $r_k$. A phase detector 28 receives samples $r_k$ and determines phase angles $\phi_k$ from the samples, which are stored in a buffer 31.

An error correction decoder 29 reads the phase angles $\phi_k$ from buffer 31 and decodes them into a block of symbols or bits ("decoded message data"), $e_k$. The decoded message data, $e_k$, may be held in correction decoder 29 or placed at a different location in buffer 31.

A signal-to-impairment ratio (SIR) calculation unit 32 determines an SIR value, $\hat{\gamma}_k$, from the phase angles $\phi_k$, either from phase detector 28 or from buffer 31. The SIR values correspond to the message data, $e_k$, from the phase angles $\phi_k$.

An error detection unit 35 receives the message data, $e_k$, and determines if the decoded data block is acceptable. There are many different methods of determining if the data block is acceptable such as calculating parity bits, or matching the decoded block to a look-up table of valid data blocks by computing a as difference metric. If the block of decoded message data is acceptable, the block is provided to an output device 37 to be further utilized.

However, if the block is unacceptable, the error detection unit 35 causes an erasure control unit to determine a phase angle in the buffer which has not yet been marked having the lowest SIR value, $\hat{\gamma}_k$, and marking it as corrupted. Error correction decoder 29 decodes the phase angles $\phi_k$ which have not been marked, ignoring the marked phase angles, into another decoded block of message data. Correction decoder 29 takes advantage of the redundancy built into the encoding scheme to process the block of message data with an error correction scheme to replace missing data pertaining to marked phase angles $\phi_k$. The data block is again checked by error detection unit 35 to determine if it is acceptable. If it is, the block of message data is provided to output device 37; if it is unacceptable, the phase angle corresponding to a lowest SIR value which has not yet been marked, is marked as corrupted by erasure control unit 33, and the processing is lo repeated with all phase angles which have been marked up until this point being omitted from decoding. A limit is set for the number of symbols which may be omitted from the processing. This limit is determined from the error-correcting capability of the code. If the data block is not acceptable when this number of have is been omitted, alternate strategy may be employed.

Figure 4:
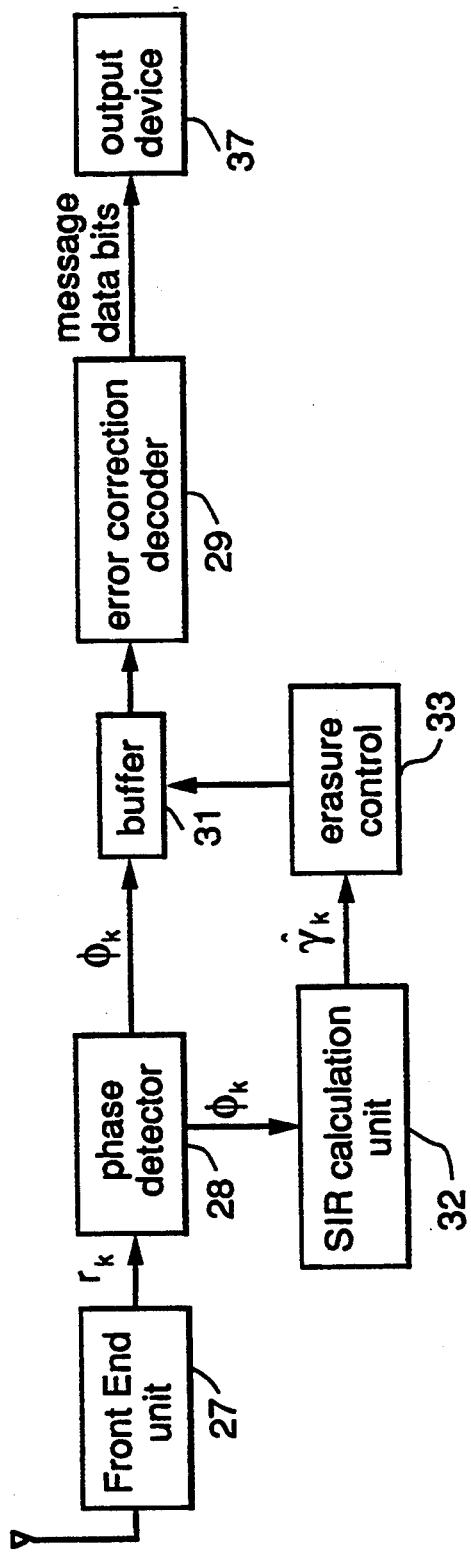
FIG. 4 is a simplified block diagram of a second embodiment of a demodulator employing signal-to-impairment ratio estimation for errors and erasures decoding, according to the present o invention.

In FIG. 4, a second embodiment is shown. Elements 27, 28 and 32 operate as described in the first embodiment. The SIR calculation unit 32, receives the phase angles $\phi_k$ and determines a SIR $\hat{\gamma}_k$ corresponding to each phase angles $\phi_k$ and passes the SIR to the erasure control unit 33. The erasure control unit 33 marks phase angles $\phi_k$ in buffer 31 pertaining to phase angles $\phi_k$ having an SIR estimate below a predetermined threshold value. Error correction decoder 29 takes advantage of the redundancy built into the encoding scheme to process the symbol phase angles $\phi_k$ with an error correction scheme to replace marked symbols, and reverse map the resulting symbols into message data which is provided to output device 37.

The metrics provided by Eqs. (22) and (24) may be used in either embodiment in determining which symbols to mark as corrupted for erasure with the threshold being selected from Eqs. (26) and (28). Erasure decoding may be implemented in channels which do not employ radio transmission by eliminating the antenna and front end 27, and connecting directly to a data line.

e. Sample Timing Selection

Another useful application of the metrics given by Eqs. (22)–(30) is sample timing selection. Each symbol of a sampled received signal comprises a number of samples. The object is to select a sample index that maximizes the SIR and decode the samples for each symbol pertaining to the chosen index. The metrics of Eqs. (22)–(30) may be used to select an effective sample within each symbol for the purpose of decoding with minimum error. An averaging type of metric such as Eqs. (23), (25), (26), (29) and (30) accumulated over several symbols is suggested for this application.

The present invention requires knowledge of the transmitted signal phase $\theta_k$. This is obtained by employing one of the following schemes. The metrics of Eqs. (22)–(30) estimate the SIR in terms of the difference in absolute phase angles between the transmitted signal ($\theta_k$) and the received signal ($\phi_k$). This is due to Eqs. (5a) and (5b) being expressed in terms of this absolute phase difference. Eqs. (5a) and (5b) may be written in terms of differential phase angles, namely, $\Delta\theta_k = \theta_k - \theta_{k-1}$ and $\Delta\phi_k = \phi_k - \phi_{k-1}$ corresponding to the transmitted and received signal differential phase angles, respectively. This is an approximation and is obtained by neglecting the cross product of noise terms between the two signaling intervals. With this approximation, the standard ML and MAP estimations as described above and the metrics of Eqs. (22)–(30) may be written in terms of $\Delta\theta_k - \Delta\phi_k$, instead of $\theta_k - \phi_k$ This modification results in a SIR that is 3 dB worse than if the estimate was made in terms of absolute phase angle differences, since noise from two symbol intervals is included in computing the differential phase angles. However, since the metrics of Eqs. (22)–(30) are used only in a relative sense (comparison against one another), the use of differential angles for SIR estimation is still effective. The modified metric, using differential phase angles, can be directly employed with differential detectors.

The present invention may be employed in mobile and portable radio receivers that will be used in indoor and mobile radio channels to effect post-detection selection diversity with differential detection, erasure decoding, PLL adaptation (AFC), MLSE phase equalization and sample timing estimation. The technique, however, is general and may be employed in radio receivers for other channels and other applications where an estimate of CSI can be used to enhance receiver performance.

While several presently preferred embodiments of the present invention have been described in detail herein, many modifications and variations will now become apparent to those skilled in the art. It is, therefore, to be understood that the appended claims are intended to cover all such modifications and variations as fall within the true spirit of the invention.

What is claimed is:

1. A method of determining a frequency of a transmitted time-varying carrier signal having a plurality of symbol phase angles selected from a set of symbol constellation phase points $\{\theta\}$ transmitted through a channel comprising the steps of:
  a) setting a receive frequency to an initial value;
  b) receiving said transmitted carrier signal at the receive frequency;
  c) detecting a plurality of phase angles $\phi_k$ each at a sampling point k of the received carrier signal;
  d) calculating a signal-to-impairment ratio (SIR) of the carrier signal indicating channel quality from phase angles $\phi_k$ according to:

$$\gamma_k^{ML} = \frac{1}{2\sin^2(\theta_k - \phi_k)}$$

where $\theta_k$ is a transmitted phase angle from the set of symbol constellation phase points $\{\theta\}$ which is closest to $\phi_k$;
  e) determining a channel quality from the SIR by comparing the SIR to a predetermined threshold, and if the SIR indicates acceptable channel quality, then:
    1. receiving an updated transmitted carrier signal,
    2. determining a frequency of the updated transmitter signal,
    3. employing a phase-locked loop to determine an estimated carrier phase difference $\Delta\Phi$ over a measured time period from the frequency of the updated transmitted carrier signal and present receive frequency, and
    4. updating the receive frequency with the estimated carrier phase difference $\Delta\Phi$ over the measured time period, and
  if the SIR does not indicate acceptable channel quality, then:
  freezing the carrier phase adjustment $\Delta\Phi$ at its current value;
  f) repeating steps "b"–"e" for subsequent signal transmissions.

2. A method of determining a frequency of a transmitted time-varying carrier signal having a plurality of symbol phase angles selected from a set of symbol constellation phase points $\{\theta\}$ transmitted through a channel comprising the steps of:
  a) setting a receive frequency to an initial value;
  b) receiving said transmitted carrier signal at the receiver frequency;
  c) detecting a plurality of phase angles $\phi_k$ each at a sampling point k of the received carrier signal;
  d) calculating a signal-to-impairment ratio (SIR) of the carrier signal indicating channel quality from phase angles $\phi_k$ according to:

$$\gamma^{ML} = \frac{1}{\frac{1}{N}\sum_{k=1}^{N} 2\sin^2(\theta_k - \phi_k)}$$

where $\theta_k$ is a transmitted phase angle from the set of symbol constellation phase points $\{\theta\}$ which is closest to $\phi_k$, and N is a number of symbols over which the SIR is desired to be averaged;
  e) determining a channel quality from the SIR by comparing the SIR to a predetermined threshold, and if the SIR indicates acceptable channel quality, then:
    1. receiving an updated transmitted carrier signal,
    2. determining a frequency of the updated transmitter signal,
    3. employing a phase-locked loop to determine an estimated carrier phase difference $\Delta\Phi$ over a measured time period from the frequency of the updated transmitted carrier signal and present receive frequency, and
    4. updating the receive frequency with the estimated carrier phase difference $\Delta\Phi$ over the measured time period, and
  if the SIR does not indicate acceptable channel quality, then:
  freezing the carrier phase adjustment $\Delta\Phi$ at its current value;
  f) repeating steps "b"–"e" for subsequent signal transmissions.

3. A method of determining a frequency of a transmitted time-varying carrier signal having a plurality of symbol phase angles selected from a set of symbol constellation phase points $\{\theta\}$ transmitted through a channel comprising the steps of:
  a) setting a receive frequency to an initial value;
  b) receiving said transmitted carrier signal at the receive frequency;
  c) detecting a plurality of phase angles $\phi_k$ each at a sampling point k of the received carrier signal;
  d) calculating a signal-to-impairment ratio (SIR) of the carrier signal indicating channel quality from phase angles $\phi_k$ according to:

$$\gamma_k^{MAP} = \frac{1}{\left(\sin^2(\theta_k - \phi_k) + \frac{1}{\gamma}\right)}$$

where $\theta_k$ is a transmitted phase angle from the set of symbol constellation phase points $\{\theta\}$ which is closest to $\phi_k$ and $\gamma$ is an average signal-to-noise ratio;
  e) determining a channel quality from the SIR by comparing the SIR to a predetermined threshold, and if the SIR indicates acceptable channel quality, then:
    1. receiving an updated transmitted carrier signal,
    2. determining a frequency of the updated transmitter signal,
    3. employing a phase-locked loop to determine an estimated carrier phase difference $\Delta\Phi$ over a measured time period from the frequency of the updated transmitted carrier signal and present receive frequency, and
    4. updating the receive frequency with the estimated carrier phase difference $\Delta\Phi$ over the measured time period, and
  if the SIR does not indicate acceptable channel quality, then:
  freezing the carrier phase adjustment $\Delta\Phi$ at its current value;
  f) repeating steps "b"–"e" for subsequent signal transmissions.

4. A method of determining a frequency of a transmitted time-varying carrier signal having a plurality of symbol phase angles selected from a set of symbol constellation phase points $\{\theta\}$ transmitted through a channel comprising the steps of:
  a) setting a receive frequency to an initial value;
  b) receiving said transmitted carrier signal at the receive frequency;
  c) detecting a plurality of phase angles $\phi_k$ each at a sampling point k of the received carrier signal;

d) calculating a signal-to-impairment ratio (SIR) of the carrier signal indicating channel quality from phase angles $\phi_k$ according to:

$$\gamma^{MAP} = \frac{1}{2\left\{\frac{1}{N}\sum_{k=1}^{N}\sin^2(\theta_k - \phi_k) + \frac{1}{\bar{\gamma}}\right\}}$$

where $\theta_k$ is a transmitted phase angle from the set of symbol constellation phase points $\{\theta\}$ which is closest to $\phi_k$, $\bar{\gamma}$ is an average signal-to-noise ratio and N is a number of symbols over which the SIR is desired to be averaged;

e) determining a channel quality from the SIR by comparing the SIR to a predetermined threshold, and if the SIR indicates acceptable channel quality, then:
 1. receiving an updated transmitted carrier signal,
 2. determining a frequency of the updated transmitter signal,
 3. employing a phase-locked loop to determine an estimated carrier phase difference $\Delta\Phi$ over a measured time period from the frequency of the updated transmitted carrier signal and present receive frequency, and
 4. updating the receive frequency with the estimated carrier phase difference $\Delta\Phi$ over the measured time period, and
if the SIR does not indicate acceptable channel quality, then:
freezing the carrier phase adjustment $\Delta\Phi$ at its current value;
f) repeating steps "b"-"e" for subsequent signal transmissions.

5. The method of determining a frequency of a transmitted time-varying carrier signal of claim 1 or 3 further comprising the step of smoothing the SIR values $\hat{\gamma}_k^{ML}$ or $\hat{\gamma}_k^{MP}$, collectively referred to as $\hat{\gamma}_k$, according to:

$$\hat{\gamma}_k^{(s)} = \frac{\sum_{m=1}^{k}\lambda^{k-m}\hat{\gamma}_m}{\sum_{m=0}^{k-1}\lambda^m}$$

where $\theta_k$ is a transmitted phase angle from the set of symbol constellation phase points $\{\theta\}$ which is closest to $\phi_k$, $\lambda$ is a value between 0 and 1 with values closer to 1 providing greater smoothing at the expense of faster tracking, and values closer to 0 providing faster tracking at the expense of lesser smoothing.

6. The method of determining a frequency of a transmitted time-varying carrier signal of claim 1 or 3 further comprising the step of smoothing the SIR values $\hat{\gamma}_k^{ML}$ or $\hat{\gamma}_k^{MAP}$, collectively referred to as $\hat{\gamma}_k$, comprising the steps of:

a) calculating the SIR values $\hat{\gamma}_k$ for k=1,2, . . . ,N to produce $\{\hat{\gamma}_1, \hat{\gamma}_2, \ldots, \hat{\gamma}_N\}$,
b) determining a median value of the calculated SIRs $\{\hat{\gamma}_1, \hat{\gamma}_2, \ldots, \hat{\gamma}_N\}$ being a median SIR $\hat{\gamma}_m^{med}$; and
c) employing the median SIR $\hat{\gamma}_m^{med}$ as the SIR value.

7. The method of determining a frequency of a transmitted time-varying carrier signal of claim 1 further comprising, before the step of determining a channel quality from the SIR, the step of:
filtering the SIR value $\hat{\gamma}_i$ with a metric filter according to the equation:

$$\gamma_k^{ave} = \sum_{i=k-L+1}^{k} h(i - k + L - 1)\gamma_i$$

where h(i) are coefficients of an impulse response of the metric filter and L is the length of the impulse response of the metric filter in symbol intervals, chosen to be the average fade duration of the channel, and employing the filtered SIR value $\hat{\gamma}_k^{ave}$ as the SIR value $\hat{\gamma}_k$.

8. The method of determining a frequency of a transmitted time-varying carrier signal of claim 1 further comprising, before the step of determining a channel quality from the SIR, the step of:
filtering the SIR value $\hat{\gamma}_i$ with a metric filter according to the equation:

$$\hat{\gamma}_k^{ave(nc)} = \sum_{i=k-M}^{k+N} h(i - k + M)\hat{\gamma}_i$$

where $$M = f\left(\frac{L}{2}\right), N = g\left(\frac{L-2}{2}\right) \text{ and } f\left(\frac{L}{2}\right)$$

is a floor function representing the largest integer less than L/2, and $$g\left(\frac{L-2}{2}\right)$$

represents a ceiling function being the smallest integer greater than $$\frac{L-2}{2},$$

h(i) are coefficients of an impulse response of the metric filter and L is the length of the impulse response of the metric filter in symbol intervals, chosen to be the average fade duration of the channel, and employing the filtered SIR value $\hat{\gamma}_k^{ave(nc)}$ as the SIR value $\hat{\gamma}_k$.

9. The method of determining a frequency of a transmitted time-varying carrier signal of claim 1 wherein the channel quality is determined by comparing the SIR to a minimum threshold value with an SIR value above the threshold value indicating an acceptable channel quality, and an SIR not above the threshold value indicating a channel quality that is not acceptable.

10. The method of determining a frequency of a transmitted time-varying carrier signal of claim 1 wherein the channel quality is determined by comparing the inverse of the SIR to a maximum threshold value with an inverse SIR value below the threshold value indicating an acceptable channel quality, and the SIR not below the threshold value indicating a channel quality that is not acceptable.

11. The method of determining a frequency of a transmitted time-varying carrier signal of claim 1, 2, 3 or 4 wherein phase angles $\phi_k$, $\theta_k$, are differential phase angles defined by:

$$\phi_k = \phi'_k - \phi'_{k-1}, \theta_k = \theta'_k - \theta'_{k-1},$$

where $\phi'_k, \theta'_k$ are absolute phase angles transmitted at time 'k', and $\phi'_{k-1}, \theta'_{k-1}$ are absolute phase angles transmitted at time 'k−1' which precedes 'k', respectively.

12. A system for providing carrier phase adjustment for a transmitted carrier signal comprising:
 a) a front end for receiving the transmitted carrier signal and providing a sampled baseband signal having a plurality of sampled phase angles $\phi_k$;
 b) a phase-locked loop (PLL) for being in an active state and an inactive state, in its active state the PLL receives the sampled baseband signal and calculates a carrier phase adjustment $\Delta\Phi$ over time, in its inactive state, the PLL retains a last calculated carrier phase difference $\Delta\Phi$ value without change;
 c) an signal-to-impairment ratio (SIR) calculation unit for calculating an SIR value $\gamma^{ML}$ from the phase angles $\phi_k$ according to:

$$\gamma^{ML} = \frac{1}{\frac{1}{N}\sum_{k=1}^{N} 2\sin^2(\theta_k - \phi_k)}$$

where $\theta_k$ is a transmitted phase angle from a set of symbol constellation phase points $\{\theta\}$ which is closest to $\phi_k$, and N is a number of symbols over which the SIR is desired to be averaged; and
 d) a loop adaption control unit coupled to the SIR calculation unit for setting the PLL to its inactive state when the calculated SIR value $\gamma_{ML}$ is above a predetermined value, and setting the PLL to its inactive state when the calculated SIR value $\gamma^{ML}$ is not above the predetermined value.

13. A system for providing carrier phase adjustment for a transmitted carrier signal comprising:
 a) a front end for receiving the transmitted carrier signal and providing a sampled baseband signal having a plurality of sampled phase angles $\phi_k$;
 b) a phase-locked loop (PLL) for being in an active state and an inactive state, in its active state the PLL receives the sampled baseband signal and calculates a carrier phase adjustment $\Delta\Phi$ over time, in its inactive state, the PLL retains a last calculated carrier phase difference $\Delta\Phi$ value without change;
 c) an signal-to-impairment ratio (SIR) calculation unit for calculating an SIR value $\gamma^{ML}$ from the phase angles $\phi_k$ according to:

$$\gamma^{MAP} = \frac{1}{2\left\{\frac{1}{N}\sum_{k=1}^{N}\sin^2(\theta_k - \phi_k) + \frac{1}{\bar{\gamma}}\right\}}$$

where $\theta_k$ is a transmitted phase angle from a set of symbol constellation phase points $\{\theta\}$ which is closest to $\phi_k$, $\bar{\gamma}$ is an average signal-to-noise ratio and N is a number of symbols over which the SIR is desired to be averaged
 d) a loop adaption control unit coupled to the SIR calculation unit for setting the PLL to its inactive state when the calculated SIR value $\gamma^{ML}$ is above a predetermined value, and setting the PLL to its inactive state when the calculated SIR value $\gamma^{ML}$ is not above the predetermined value.

* * * * *